Patented Nov. 30, 1948

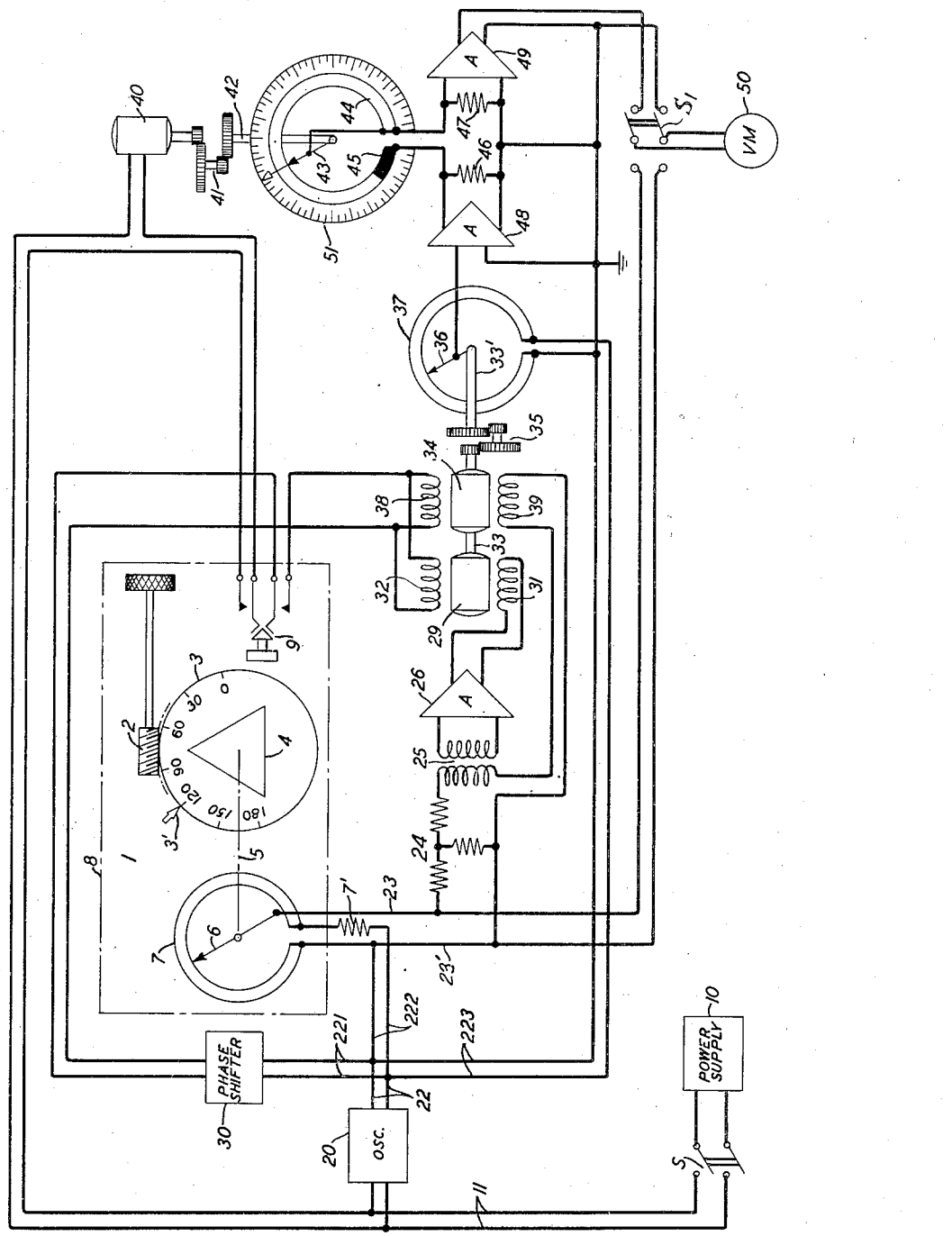

2,455,035

UNITED STATES PATENT OFFICE 2,455,035

AVERAGING MECHANISM

Hendrik W. Bode, Summit, N. J., assignor to Bell Telephone Laboratories, Incorporated, New York, N. Y., a corporation of New York Application January 30, 1946, Serial No. 644,272

5 Claims. (Cl. 235—61)

This invention relates to an averaging system, particularly useful for indicating the average value, during a chosen time interval, of an observed quantity, for example, the altitude of a heavenly body.

If the observations are of an inherently constant quantity, such as the elevation of a fixed object, the average value may be taken to represent the true value of the qantity without further qualification. In the case of such a quantity as the altitude of a heavenly body, however, the true value of the observed quantity may vary appreciably during the course of the observations. It is then necessary to specify also the instant at which the true value of the quantity is supposed to be equal to the observed average. This instant will be called the "average time" or the "time to which the average corresponds" in this disclosure.

It has been the practice in observing such a quantity as the altitude of a heavenly body to make a series of separate readings of an observing instrument, noting the watch time of each, and then to take the averages of all readings and of the corresponding watch times, recording the average altitude so obtained as that corresponding to the average time. Obviously, it is of advantage to make continuous observations, noting only the time of beginning and read at any desired later instant the average of the observations up to that instant and also the time to which that average corresponds. The invention herein described enables that to be done.

It is therefore an object of the invention to provide a system of apparatus wherewith are obtained the average of observations continuously made of a quantity varying with time and the instant of time to which that average corresponds. More broadly stated, the object of the invention is to provide a system of apparatus for reading the time average of a series of observations, whether continuously made or not.

Specifically, an object of the invention is to provide an electromechanical system for obtaining the time average of a series of observations of a fixed or varying quantity, by means of apparatus nearly all of which may be located at any desired distance from the point of observation.

If a series of observations of a quantity E is made during a time interval $t_1 - t_0$, where $t_0$ is the time of beginning and $t_1$ the time of conclusion of the period of observation, the time average is by definition $$\frac{1}{t_1 - t_0} \int_{t_0}^{t_1} E_t \, dt$$

$E_t$ being the value of E observed at any instant $t$ within the interval $t_1 - t_0$. If $E_t$ is observed continuously or at equal intervals, the time to which the average refers is $$\frac{t_1 - t_0}{2}$$

The present invention provides a system of apparatus with which the time average and the central instant to which it corresponds are automatically and continuously obtained, and this is another object of the invention.

The invention will be described with reference to a preferred embodiment thereof, diagrammatically illustrated in the single figure of the accompanying drawing.

In the figure, an observing instrument such as the octant used in navigation to measure stellar altitudes, generally designated by numeral 1, is symbolized by tangent screw shaft 2 operable by hand to rotate graduated dial 3 on which is supported octant prism 4. Dial 3 is provided with a scale graduated in angle, and its setting is read at index 3'. Concentric and turning with dial 3 is shaft 5, which carries brush 6 wiping circular potentiometer 7 mounted concentrically with shaft 5. The winding of potentiometer 7 is of resistance uniform with arc for nearly 360 degrees; the incomplete closure of the potentiometer circle is allowed for by a suitable series resistance 7'. Dashed rectangle 8 incloses the instrument mentioned with potentiometer 7 and key 9 later referred to, and this is all the apparatus which must be carried by the observer.

When switch S is closed, power supply 10, preferably of alternating current, supplies through conductors 11 power to energize oscillator 20, which may be of any known type and generates an alternating current of convenient frequency, say 1000 cycles per second. Power supply 10 also supplies current to motor 40, the function of which is later explained.

The output voltage of oscillator 20 is supplied over conductors 22 via branches 221, 222 and 223 to 90-degree phase shift network 30, to potentiometer 1 and to potentiometer 37, respectively. Network 30 may be of the form disclosed in United States Patent 2,144,668, January 24, 1939, to O. E. Stoessel. Potentiometer 37 is wound similarly to potentiometer 7, except that its incomplete closure needs no compensation such as resistance 7'. One side of the oscillator output circuit may be grounded as shown.

Rotation of shaft 5 in response to the observer's manipulation enables brush 6 to derive from potentiometer 7 a voltage proportional to an angle read on dial 3, and thus proportional to the quantity observed. Continuing manipulation by the observer results in variations in this voltage which include observational errors in conjunction with inherent changes in the quantity under observation. The voltage to ground at brush 6 is at all times proportional to the reading of dial 3, and the time average of this voltage is likewise proportional to the desired time average, namely, that of the observations.

To obtain the time integral of the voltage at brush 6, that voltage is impressed via conductors 23 and 23' on the input of an attenuator 24, consisting of a resistance T-network of known design. The output terminals of attenuator 24 are connected across the primary winding of transformer 25 of which the secondary is connected to the input circuit of amplifier 26, a feedback amplifier of conventional design. Attenuator 24 serves primarily as an isolating pad between transformer 25 and brush 6.

Motor 29, which may be a "spinner" motor of known form, is a two-phase induction motor having windings 31 and 32 of which winding 31 is traversed by the output current of amplifier 26. Winding 32 is supplied with current from oscillator 20 through 90-degree phase shift 30, it being understood that the phase of the voltage across winding 31 is the same as that of the voltage applied across the input of attenuator 24; this results from an even number of phase reversals effected in transformer 25 and amplifier 26 in tandem. The rotor of motor 29 is thus driven at a speed proportional to the voltage from brush 6 to ground, and shaft 33 of this rotor is continued through the rotor of generator 34 and through reduction gear 35 to drive brush 36, insulated from the driving shaft 33' and wiping over potentiometer 37 with which the driving shaft is concentric. Generator 34 is similar in construction to motor 29.

In parallel with field winding 32 of motor 29 is field winding 38 of generator 34, in the other winding 39 of which there is induced when shaft 33 rotates a voltage proportional to the shaft speed. Winding 39 is connected in series with the primary winding of transformer 25, in phase opposition of the voltage from brush 6. Such an arrangement is known to the art. When the gain of amplifier 26 is high it serves to make the rotational speed of shaft 33 accurately proportional to the voltage from brush 6 through pad 24, since a slight difference between the voltage from brush 6 and the voltage from winding 39 appears as a large correcting voltage on motor 29.

The angular position of brush 36 is thus proportional at any instant to the product of the speed of shaft 33 by the time interval from the moment of closing key 9 which applies energizing voltage across windings 32 and 38. Shaft 33 has, as above described, a speed proportional to the voltage at brush 6 and so to the setting of dial 3. If this setting is varied by the observer, brush 36 never retreats but continually advances and it is obvious that its position at any time $t_1$ is the time integral of the setting of dial 3, counted from the initial instant $t_0$ at which key 9 is closed. From the constant voltage from oscillator 20 across potentiometer 37, brush 36 thus derives a voltage proportional to the time integral $$\int_{t_0}^{t_1} S\,dt$$

where $S$ is the reading of dial 3 at any moment. As an alternative to the above arrangement, energizing voltages may be applied to windings 32 and 38 continuously with motor 29 connected to shaft 33 through a quick-acting clutch. Since motor 29 will generally require a small amount of time to come up to speed, this arrangement, though more complicated, is preferable if extremely accurate starting conditions are required. A similar clutch arrangement may also be used in conjunction with motor 40, which is described later.

The time integral voltage is to be divided by the time interval $t_1-t_0$ over which it has been taken. The division is accomplished by the operation of motor 40, which may be an induction motor of any known design, supplied with power from source 10 when key 9 is closed. Motors 29 and 40 thus operate simultaneously, starting at the instant $t_0$.

Motor 40 then drives shaft 42 through reduction gear 41 at constant speed. Brush 43, fixed on but insulated from shaft 42, wipes over the winding of circular potentiometer 44 concentric with shaft 42. Except for a minute short-circuited portion 45, the winding of potentiometer 44 is the same as that of potentiometer 37.

Potentiometer 44 is connected in series with two resistances 46 and 47, which are respectively across the output of amplifier 48 and across the input of amplifier 49. These resistances represent the total impedances exhibited by amplifiers 48 and 49, including the effects, if any exist, of feedback on these amplifiers. The input of amplifier 48 receives the time integral voltage representing $$\int_{t_0}^{t_1} S\,dt$$

from brush 36, while on the input of amplifier 49 there is impressed a voltage proportional to the input voltage of amplifier 48 divided by the sum of resistances 46 and 47 and the resistance included between brush 43 and short-circuited portion 45, brush 43 being connected to the terminal of resistance 47 remote from the common connection to ground of resistors 46 and 47.

Before beginning observations with instrument 1, brushes 6 and 36 are set to stand at the grounded terminals of potentiometers 7 and 37, respectively, and brush 43 is set at the ungrounded terminal of resistance 46. Switch S is closed and the observer makes an initial setting of dial 3. Thereupon he closes key 9, simultaneously energizing motor 29, generator 34, and motor 40. As the observations continue, brush 36 continuously derives the time integral voltage supplied to the input of amplifier 48.

Shaft 42 drives brush 43 at constant speed. Short-circuited portion 45 occupies on potentiometer 44 an angular extent corresponding to resistances 46 and 47; these resistances are chosen conveniently small so that after brush 43 leaves portion 45 the total resistance included, at any moment $t$, between the ungrounded terminal of resistance 46 and the grounded terminal of resistance 47, is proportional to the interval $t-t_0$ through which observations have been going on. It is readily seen that the voltage input to amplifier 49 is proportional to the time integral voltage from brush 36 divided by a resistance proportional to the interval of observation, except during a conveniently minute time interval in which brush 43 is passing over portion 45.

It is to be understood that amplifiers 26, 48 and 49 may be stabilized by reverse feedback in well-known fashion, the gains of these amplifiers being chosen to provide any desired voltage scales. Amplifiers 48 and 49 are provided in order to have fixed terminal resistances to facilitate the functioning of brush 43.

At the time $t_1$ when the observer wishes to discontinue the observations with instrument 1, key 9 is opened and both motors come to rest.

The output voltage from amplifier 49 is then proportional to $$\frac{1}{t_1-t_0}\int_{t_0}^{t_1} S\,dt$$

that is, to the average setting S of dial 3, of which the final setting may be read at index 3'. Voltmeter 50 may be connected by switch $S_1$ to read either the time average voltage from amplifier 49 or that corresponding to the final setting of brush 6. The scale of voltmeter 50 is suitably graduated to read voltage in terms of angle.

As previously stated, the observations are assumed to be continuous. The time to which the average setting refers is $$t_0 + \frac{t_1-t_0}{2}$$

A scale 51, concentric with potentiometer 44, may be provided and graduated in seconds of time. If up to two minutes may be required for a satisfactory series of observations, the angular speed of motor 40 and the ratio of gear 41 are to be so chosen that a complete traverse of potentiometer 44 by brush 43 shall take two minutes. This may be the interval required for a complete set of observations; the time instant in that interval to which the average refers is 1 minute later than $t_0$, namely the instant at which the observer closes key 9. Scale 51 is calibrated to read one-half the time actually elapsing between $t_0$, when observation began, and $t_1$, when they ceased on the opening of key 9; the reading of scale 51 is then, at any time of ceasing to observe, one-half the time interval since observations began. Scale 51 then bears numerals from 0 to 60, uniformly increasing from the left to the right end of the nearly complete circle of potentiometer 44. Scale 51 is read by a pointer extended from brush 43, and the reading at any time $t_1$ will be $$\frac{t_1-t_0}{2}$$

The observer is then required to note only the time at which he closes key 9; at the conclusion of his observations he opens key 9, reads voltmeter 50 (switch $S_1$ closed to the right) and scale 51. The reading of voltmeter 50 then is average of the observed altitudes, and the watch time of beginning plus the reading of scale 51 is the time instant corresponding to the average altitude.

It is apparent that all of the apparatus except the observing instrument itself, key 9 and potentiometer 7, may be located at a point remote from the observer.

Any known means of producing angular speed proportional to a control voltage may be substituted for motor 29 and generator 34, as well as for motor 40. For greater accuracy, the control of shaft 42 may be made similar to that of shaft 33', and the control means shown in the figure may be replaced by any known means for producing an angular velocity proportional to an impressed voltage.

What is claimed is:

1. Averaging mechanism comprising means for obtaining a voltage varying in accordance with a quantity to be averaged over a defined time interval, means for defining the time interval, a movable member, means for driving the member at a velocity proportional to the voltage, means actuated by the member for producing a second voltage increasing in accordance with the displacement of the member and means controlled by the defining means for deriving from the second voltage a third voltage proportional to the second voltage divided by the time interval over which the quantity is to be averaged.

2. Averaging mechanism for obtaining a voltage proportional to the time average of a series of values of a quantity measured throughout a time interval comprising a source of voltage, means for deriving from the source a voltage varying in accordance with the measured value of the quantity, a movable member, means controlled by the derived voltage for driving the member at a velocity proportional to the derived voltage, means actuated by the member for deriving from the source a second voltage proportional to the displacement of the member during the interval and means for deriving from the second voltage a third voltage inversely proportional to the length of the interval and directly proportional to the displacement.

3. A system of apparatus for indicating the time average of a series of values of a quantity measured by an observing instrument continuously throughout a time interval comprising a power supply, a source of voltage energized by the power supply, means controlled by the observing instrument for deriving from the source a first voltage continuously proportional to the measured value of the quantity, a rotatable shaft, motor means controlled by the first voltage for driving the shaft at an angular velocity proportional to the first voltage, means actuated by the shaft for deriving from the source a second voltage proportional to the angular displacement of the shaft during the interval, a second motor means uniformly driven from the power supply throughout the interval, means controlled by the second motor means for selecting a resistance varying continuously with the time elapsed since the beginning of the interval, means for deriving from the second voltage a third voltage proportional to the second voltage divided by the selected resistance and means for indicating the value of the third voltage.

4. A system of apparatus as in claim 3, including means for energizing the first and the second motor means at the beginning of the time interval and for deenergizing both said means at the end of the interval.

5. A system of apparatus as in claim 3, including means controlled by the second motor means for indicating the central instant of the interval of observation.

HENDRIK W. BODE.

REFERENCES CITED

The following references are of record in the file of this patent:

UNITED STATES PATENTS

| Number | Name | Date |
| --- | --- | --- |
| 1,533,530 | Wheatley | Apr. 14, 1925 |